US009756574B2

United States Patent
Larsson et al.

(10) Patent No.: US 9,756,574 B2
(45) Date of Patent: Sep. 5, 2017

(54) SYSTEM AND METHOD FOR IMPROVING UPLINK CONTROL CHANNELS FOR WEAK COMMUNICATION LINKS

(71) Applicant: Telefonaktiebolaget L M Ericsson (publ), Stockholm (SE)

(72) Inventors: Erik Larsson, Uppsala (SE); Billy Hogan, Sollentuna (SE); Patrik Karlsson, Sollentuna (SE); Anders Lamm, Mölndal (SE); Fredrik Ovesjö, Älvsjö (SE); Peter Von Wrycza, Stockholm (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 104 days.

(21) Appl. No.: 14/438,407

(22) PCT Filed: Feb. 20, 2015

(86) PCT No.: PCT/SE2015/050198
§ 371 (c)(1),
(2) Date: Apr. 24, 2015

(87) PCT Pub. No.: WO2015/142244
PCT Pub. Date: Sep. 24, 2015

(65) Prior Publication Data
US 2016/0249298 A1 Aug. 25, 2016

Related U.S. Application Data

(60) Provisional application No. 61/968,671, filed on Mar. 21, 2014.

(51) Int. Cl.
*H04W 4/00* (2009.01)
*H04W 52/14* (2009.01)
(Continued)

(52) U.S. Cl.
CPC ....... *H04W 52/146* (2013.01); *H04W 52/325* (2013.01); *H04W 52/40* (2013.01);
(Continued)

(58) Field of Classification Search
CPC ..... H04W 24/04; H04W 72/08; H04W 16/06; H04W 36/04; H04W 52/32;
(Continued)

(56) References Cited

U.S. PATENT DOCUMENTS

2007/0140162 A1* 6/2007 Taylor ................. H04W 52/146
370/329
2008/0207247 A1* 8/2008 Gholmieh ............. H04W 52/56
455/522

(Continued)

FOREIGN PATENT DOCUMENTS

WO    WO 2010/051514    5/2010

OTHER PUBLICATIONS

3GPP TSG RAN WG1 Meeting #72bis; Chicago, USA; Title: Solutions for UL/DL imbalances in Hetnets (R1-131576), Apr. 15-19, 2013.
(Continued)

*Primary Examiner* — Ian N Moore
*Assistant Examiner* — Phong La
(74) *Attorney, Agent, or Firm* — Baker Botts, LLP

(57) ABSTRACT

A method in a network node (115A-C, 120, 130) comprises providing (704) to a user equipment (UE) (110A-C) a dedicated physical control channel (DPCCH), the DPCCH having an associated first fractional dedicated physical channel (F-DPCH) for conveying transmit power control (TPC) commands to the UE for power controlling the DPCCH, the first F-DPCH having a first allocated slot format; providing (708) to the UE a dedicated physical control channel2 (DPCCH2) (502), the DPCCH2 comprising an uplink con-
(Continued)

trol channel power controlled by the network node for communicating TPC commands to the network node, the DPCCH2 having an associated second F-DPCH for conveying transmit power control commands to the UE for power controlling the DPCCH2, the second F-DPCH having a second allocated slot format different from the first allocated slot format; and communicating (712) to the UE an uplink TPC command on the second F-DPCH having the second allocated slot format.

22 Claims, 12 Drawing Sheets

(51) Int. Cl.
    *H04W 52/32*     (2009.01)
    *H04W 52/40*     (2009.01)
    *H04W 72/04*     (2009.01)
    *H04W 76/04*     (2009.01)
    *H04W 52/12*     (2009.01)
    *H04W 52/24*     (2009.01)

(52) U.S. Cl.
    CPC ..... *H04W 72/0446* (2013.01); *H04W 76/048* (2013.01); *H04W 52/12* (2013.01); *H04W 52/241* (2013.01)

(58) Field of Classification Search
    CPC ........... H04W 52/146; H04W 72/0446; H04W 76/048; H04W 52/325; H04W 52/40; H04W 52/12; H04W 52/241
    See application file for complete search history.

(56) References Cited

U.S. PATENT DOCUMENTS

| | | | |
|---|---|---|---|
| 2009/0143016 A1* | 6/2009 | Li | H04W 52/40 455/63.1 |
| 2009/0168750 A1* | 7/2009 | Pelletier | H04W 52/50 370/350 |
| 2010/0130219 A1* | 5/2010 | Cave | H04W 72/02 455/450 |
| 2010/0172428 A1* | 7/2010 | Pani | H04L 1/0026 375/262 |
| 2010/0254324 A1* | 10/2010 | Van Lieshout | H04W 52/286 370/329 |
| 2010/0273520 A1* | 10/2010 | Pelletier | H04L 5/0007 455/522 |
| 2011/0176593 A1* | 7/2011 | Hultell | H04B 7/0404 375/224 |
| 2012/0113825 A1* | 5/2012 | Baglin | H04W 24/00 370/252 |
| 2012/0157152 A1* | 6/2012 | Blomgren | H04W 52/146 455/522 |
| 2012/0281642 A1* | 11/2012 | Sambhwani | H04W 52/325 370/329 |
| 2012/0282972 A1* | 11/2012 | Folkstedt | H04W 52/545 455/522 |
| 2013/0010704 A1* | 1/2013 | Kronquist | H04W 52/38 370/329 |
| 2013/0142076 A1* | 6/2013 | Ramos | H04W 24/00 370/254 |
| 2013/0229906 A1* | 9/2013 | Akkarakaran | H04L 5/0044 370/216 |

OTHER PUBLICATIONS

3GPP TSG RAN WG1 Meeting #65; Barcelona, Spain; Title: Remaining design considerations for CLTD (R1-111750) May 9-13, 2011.
PCT Notification of Transmittal of the International Search Report and the Written Opinion of the International Searching Authority, or the Declaration for International application No. PCT/SE2015/050198, May 15, 2015.
3GPP TS 25.211 v11.5.0; Technical Specification; 3rd Generation Partnership Project; Technical Specification Group Radio Access Network; Physical channels and mapping of transport channels onto physical channels (FDD) (Release 11), Jun. 2014.
3GPP TSG RAN WG1 Meeting #76bis; Shenzhen, P.R. China; Source: Ericsson; Title: On Reliability of Uplink Control Channels in Heterogeneous Network Deployments (R1-14xxxx), Mar. 31-Apr. 4, 2014.

* cited by examiner

SYSTEM AND METHOD FOR IMPROVING UPLINK CONTROL CHANNELS FOR WEAK COMMUNICATION LINKS

PRIORITY

This nonprovisional application is a U.S. National Stage Filing under 35 U.S.C. §371 of International Patent Application Serial No. PCT/SE2015/050198, filed Feb. 20, 2015, and entitled "System and Method for Improving Uplink Control Channels for Weak Communication Links" which claims priority to U.S. Provisional Patent Application No. 61/968,671 filed Mar. 21, 2014, both of which are hereby incorporated by reference in their entirety.

TECHNICAL FIELD

Particular embodiments relate generally to wireless communications, and more particularly to a system and method for improving uplink control channels when a communication link between a wireless device and a network node is weak.

BACKGROUND

In a wireless network, a wireless device may communicate with one or more radio access nodes to send and/or receive information, such as voice traffic, data traffic, control signals, and so on. In some cases, the wireless device may have a connection with multiple radio access nodes of different link quality. A problem may arise where important control information is to be transmitted to the wireless device, but the link quality with a particular radio access node is weak. For example, in a Wideband Code Division Multiple Access (WCDMA) system, a wireless device in soft handover (SHO) is essentially power-controlled by the best uplink (UL) cell. If the best UL is a non-serving cell, it may be difficult to ensure that important control information is reliably received at the serving cell.

For example, channels such as the High Speed Dedicated Physical Control Channel (HS-DPCCH) and Enhanced Dedicated Physical Control Channel (E-DPCCH) may carry important control information, such as hybrid automatic repeat request (HARQ) and positive acknowledgement (ACK)/negative acknowledgement (NACK) feedback for high speed downlink packet access (HSDPA). In existing implementations, HS-DPCCH and E-DPCCH may have a legacy dedicated physical control channel (DPCCH) as their reference channel. Other channels, such as E-DPDCH, which carries general data payload as well as in-band scheduling, may also be set relative DPCCH. In the scenario described above, DPCCH may be power controlled by all the cells in an active set, including the non-serving cell. Difficulties may arise from using a channel that is essentially power controlled by a non-serving cell as a reference for channels carrying important control information that needs to be received in the serving cell. For example, it is difficult to ensure reliable reception of these channels at the serving cell, and thus receipt of the control information by the serving cell cannot be guaranteed. The problem of weak communication links becomes particularly pronounced when the imbalance between the best UL and downlink (DL) becomes large, such as for heterogeneous networks or multi-flow operation.

Deployment of low-power nodes (LPNs) is seen as a powerful tool to meet the ever-increasing demand for mobile broadband services. A LPN may correspond, for example, to a remote radio unit (RRU), pico, or micro base station, allowing expansion of network capacity in a cost-efficient way. A network consisting of traditional macro base stations and LPNs is referred to as a heterogeneous network. Two examples of use-cases for heterogeneous network deployment that may be envisioned are coverage holes and capacity enhancement for localized traffic hotspots.

FIG. 1 is a block diagram illustrating an embodiment of a network 100. Network 100 includes one or more wireless devices 110, radio network nodes 115, radio network controller 120, and core network nodes 130. Network 100 may be any suitable type of network. For example, network 100 may be a heterogeneous network of the kind described above, and network nodes 115 may be a mixture of macro nodes and LPNs. Wireless device 110 may communicate with a radio network node 115 over a wireless interface. For example, wireless device 110 may transmit wireless signals to radio network node 115, and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network. Example embodiments of wireless device 110, radio network node 115, and a network node (such as radio network controller 120 or core network node 130) are described with respect to FIGS. 10, 11, and 12, respectively.

Wireless device 110 may communicate with multiple radio network nodes 115. The communication links between wireless device 110 and radio network nodes 115 may be of differing quality. If the link quality with a particular radio access node is weak, difficulties may arise in ensuring receipt of important control information. These problems are described in more detail below.

SHO, also referred to as macro diversity, and fast closed-loop power control are essential features of WCDMA and high speed packet access (HSPA). FIG. 2 illustrates a traditional HSPA deployment scenario with two radio access nodes 115A and 115B having similar transmit power levels. For example, network nodes 115A and 115B may both be macro nodes with similar transmit power levels. Ideally, a wireless device 110A moving from serving cell 115A to non-serving cell 115B would enter the SHO region 202 at point A 204. At point B 206, a serving cell change would occur. During a serving cell change, the non-serving cell becomes the serving cell and vice versa. For example, during a serving cell change macro node 115A, the current serving cell, would become the non-serving cell, and the current non-serving cell 115B would become the serving cell. At point C 208, wireless device 110A would leave the SHO region.

A radio network controller, such as radio network controller 120 described above in relation to FIG. 1, is in control of reconfigurations. This may imply rather long delays for performing a cell change. During SHO, wireless device 110A may be power-controlled by the best uplink cell. In the scenario illustrated in FIG. 2, network nodes 115A and 115B have roughly the same transmit power, so the optimal DL and UL cell borders will coincide, i.e., the path loss from wireless device 110A to network nodes 115A and 115B will be equal at point B 206. Hence, in an ideal setting, and from a static (long-term fading such as shadowing) point of view, the serving cell 115A would always have the best uplink. In practice, however, due to imperfections (e.g., reconfiguration delays) and fast fading, wireless device 110A might be power controlled by non-serving cell 115B during SHO. In such a case, problems may arise due to the weaker link between serving cell 115A and wireless device 110A. For example, receiving essential control channel information, such as hybrid automatic repeat request (HARQ), Positive acknowledgement (ACK)/negative acknowledgement (NACK) feedback for HSDPA, and scheduling information for enhanced uplink (EUL), may be problematic.

FIG. 3 illustrates a HSPA deployment scenario with two radio access nodes 115A, 115B having different transmit power levels. In the scenario illustrated in FIG. 3, radio access node 115A is a macro node, and radio access node 115B is a LPN. Since macro node 115A and LPN 115B have different transmit power levels, the UL and downlink (DL) cell borders may not necessarily coincide. For example, wireless device 110A has a smaller path loss to LPN 115B, while the strongest received power is from macro node 115A. In such a scenario, the UL is better served by LPN 115B while the DL is provided by serving macro node 115A.

In FIG. 3, the region between the equal path loss border and equal downlink received power (e.g., common pilot channel (CPICH) receive power) border may be referred to as an imbalance region. In this region, some fundamental problems may be encountered. For example, wireless device 110A in position A 302 would have macro node 115A as the serving cell, but be power controlled towards LPN 115B. Due to the UL-DL imbalance, the UL towards serving macro node 115A may be very weak. In such circumstances, important control information, such as EUL scheduling information or HS-DPCCH might not be reliably decoded in the serving cell.

This problem may be addressed to some extent by utilizing available RNC based cell selection offset parameters. By tuning the Cell Individual Offset (CIO) parameter, the handover border can be shifted towards the optimal UL border. Similarly, the IN_RANGE and OUT_RANGE parameters may be adjusted in order to extend the SHO region.

FIG. 4 illustrates SHO operation for HSPA in a heterogeneous deployment with range extension, in accordance with certain embodiments. Like FIG. 3, FIG. 4 includes two radio access nodes 115A and 115B having different transmit power levels. More particularly, radio access node 115A is a macro node, and radio access node 115B is a LPN. FIG. 4 illustrates the effect of adjustments to the CIO parameter described above. While the adjustments to the CIO parameter may be beneficial from a system performance point of view, in certain heterogeneous networks the power difference between macro node 115A and LPN 115B may be more than 10 dB. In practice, it is unlikely the CIO parameter will be set to more than 6 dB due to considerations such as DL signaling cost in terms of radio resource consumption. As a result, the imbalance region may not be eliminated by means of CIO setting.

During RAN #56 in September 2012, a study item (SI) was initiated on UMTS Heterogenous Networks. During the SI, many solutions had been proposed to address the problem of scheduling information and HS-DPCCH reception in the serving cell for UEs 110 in the imbalance region having macro node 115A as the serving cell (region B in FIG. 4). One proposed solution is to provide a new secondary pilot channel (DPCCH2), in the UL.

SUMMARY

To address the foregoing problems with existing solutions, disclosed is a method for controlling uplink transmit power in a network node. The method comprises providing to a user equipment a dedicated physical control channel, the dedicated physical control channel having an associated first fractional dedicated physical channel for conveying transmit power control commands to the user equipment for power controlling the dedicated physical control channel, the first fractional dedicated physical channel having a first allocated slot format. The method further comprises providing to the user equipment a dedicated physical control channel2 (DPCCH2), the DPCCH2 comprising an uplink control channel power controlled by the network node for communicating transmit power control commands to the network node, the DPCCH2 having an associated second fractional dedicated physical channel for conveying transmit power control commands to the user equipment for power controlling the DPCCH2, the second fractional dedicated physical channel having a second allocated slot format different from the first allocated slot format. The method further comprises communicating to the user equipment an uplink transmit power control command on the second fractional dedicated physical channel having the second allocated slot format.

In certain embodiments, the first fractional dedicated physical channel may have an associated first spreading code and the second fractional dedicated physical channel may have an associated second spreading code. The dedicated physical control channel may have a first power level and the method may further comprise setting an initial power level for the DPCCH2. The initial power level for the DPCCH2 may be equal to the first power level of the dedicated physical control channel plus an extra margin. The extra margin may be equal to zero. The initial power level for the DPCCH2 may be set upon initiating transmission of the DPCCH2. The step of setting the initial power level for the DPCCH2 may comprise determining the extra margin of the second power level based at least in part on a comparison of a number of transmit power control uplink requests and a number of transmit power control downlink requests from a serving cell.

In certain embodiments, operation of the DPCCH2 may be controlled by a discontinuous transmission pattern of the dedicated physical control channel, and the DPCCH2 may only be transmitted when the dedicated physical control channel is transmitted. The DPCCH2 may be configured only on a primary uplink carrier.

Also disclosed is a network node. The network node comprises one or more processors. The one or more processors are configured to provide to a user equipment a dedicated physical control channel, the dedicated physical control channel having an associated first fractional dedicated physical channel for conveying transmit power control commands to the user equipment for power controlling the dedicated physical control channel, the first fractional dedicated physical channel having a first allocated slot format. The one or more processors are configured to provide to the user equipment a dedicated physical control channel2 (DPCCH2), the DPCCH2 comprising an uplink control channel power controlled by the network node for communicating transmit power control commands to the network node, the DPCCH2 having an associated second fractional dedicated physical channel for conveying transmit power control commands to the user equipment for power controlling the DPCCH2, the second fractional dedicated physical channel having a second allocated slot format different from the first allocated slot format. The one or more processors are configured to communicate to the user equipment an uplink transmit power control command on the second fractional dedicated physical channel having the second allocated slot format.

Also disclosed is a method for controlling uplink transmit power in a user equipment. The method comprises receiving provisioning by a network node of a dedicated physical control channel, the dedicated physical control channel having an associated first fractional dedicated physical channel for conveying transmit power control commands to the user equipment for power controlling the dedicated physical control channel, the first fractional dedicated physical channel having a first allocated slot format. The method further comprises receiving provisioning by the network node of a dedicated physical control channel2 (DPCCH2), the DPCCH2 comprising an uplink control channel power controlled by the network node for communicating transmit power control commands to the network node, the DPCCH2 having an associated second fractional dedicated physical channel for conveying transmit power control commands to the user equipment for power controlling the DPCCH2, the second fractional dedicated physical channel having a second allocated slot format different from the first allocated slot format. The method further comprises receiving, from the network node, an uplink transmit power control command on the second fractional dedicated physical channel having the second allocated slot format.

In certain embodiments, the first fractional dedicated physical channel has an associated first spreading code and the second fractional dedicated physical channel has an associated second spreading code. The dedicated physical control channel may have a first power level and the DPCCH2 may have an initial power level. The initial power level may be equal to the first power level of the dedicated physical control channel plus an extra margin. The extra margin may be equal to zero. The initial power level for the DPCCH2 may be set upon initiating transmission of the DPCCH2. The initial power level for the DPCCH2 may be based at least in part on a comparison of a number of transmit power control uplink requests and a number of transmit power control downlink requests from a serving cell. Operation of the DPCCH2 may be controlled by a discontinuous transmission pattern of the dedicated physical control channel, and the DPCCH2 may only be transmitted when the dedicated physical control channel is transmitted. The DPCCH2 may be configured only on a primary uplink carrier.

Also disclosed is a user equipment. The user equipment comprises one or more processors. The one or more processors are configured to receive provisioning by a network node of a dedicated physical control channel, the dedicated physical control channel having an associated first fractional dedicated physical channel for conveying transmit power control commands to the user equipment for power controlling the dedicated physical control channel, the first fractional dedicated physical channel having a first allocated slot format. The one or more processors are configured to receive provisioning by the network node of a dedicated physical control channel2 (DPCCH2), the DPCCH2 comprising an uplink control channel power controlled by the network node for communicating transmit power control commands to the network node, the DPCCH2 having an associated second fractional dedicated physical channel for conveying transmit power control commands to the user equipment for power controlling the DPCCH2, the second fractional dedicated physical channel having a second allocated slot format different from the first allocated slot format. The one or more processors are configured to receive, from the network node, an uplink transmit power control command on the second fractional dedicated physical channel having the second allocated slot format.

Some embodiments of the disclosure may provide one or more technical advantages. For example, in certain embodiments, problems associated with DL/UL communication involving several links, where some of the links are weak, may be addressed. As one example, certain embodiments may be less costly in terms of DL code resources and UL interference pollution, as well as potentially more flexible and efficient. As another example, certain embodiments may provide a network controlled approach for determining a reference channel. As still another example, certain embodiments may ensure efficient ways of conveying transmit power control commands on the DL.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Particular embodiments are described in FIGS. 1-12 of the drawings, like numerals being used for like and corresponding parts of the various drawings.

As described above, problems may arise where important control information is to be transmitted to a wireless device, but the link quality with a particular radio network node is weak. The problem of weak communication links becomes particularly pronounced when the imbalance between the best UL and downlink (DL) becomes large, such as for heterogeneous networks or multi-flow operation, where nodes having different transmit power may be deployed. Heterogeneous network deployment may be particularly useful in situations where there are coverage holes, as well as for capacity enhancement for localized traffic hotspots. The present disclosure contemplates various embodiments, including certain embodiments that may improve reception of control information at the serving cell, as well as other embodiments that may improve upon the proposed secondary pilot based solution described in more detail below.

Figure 1:
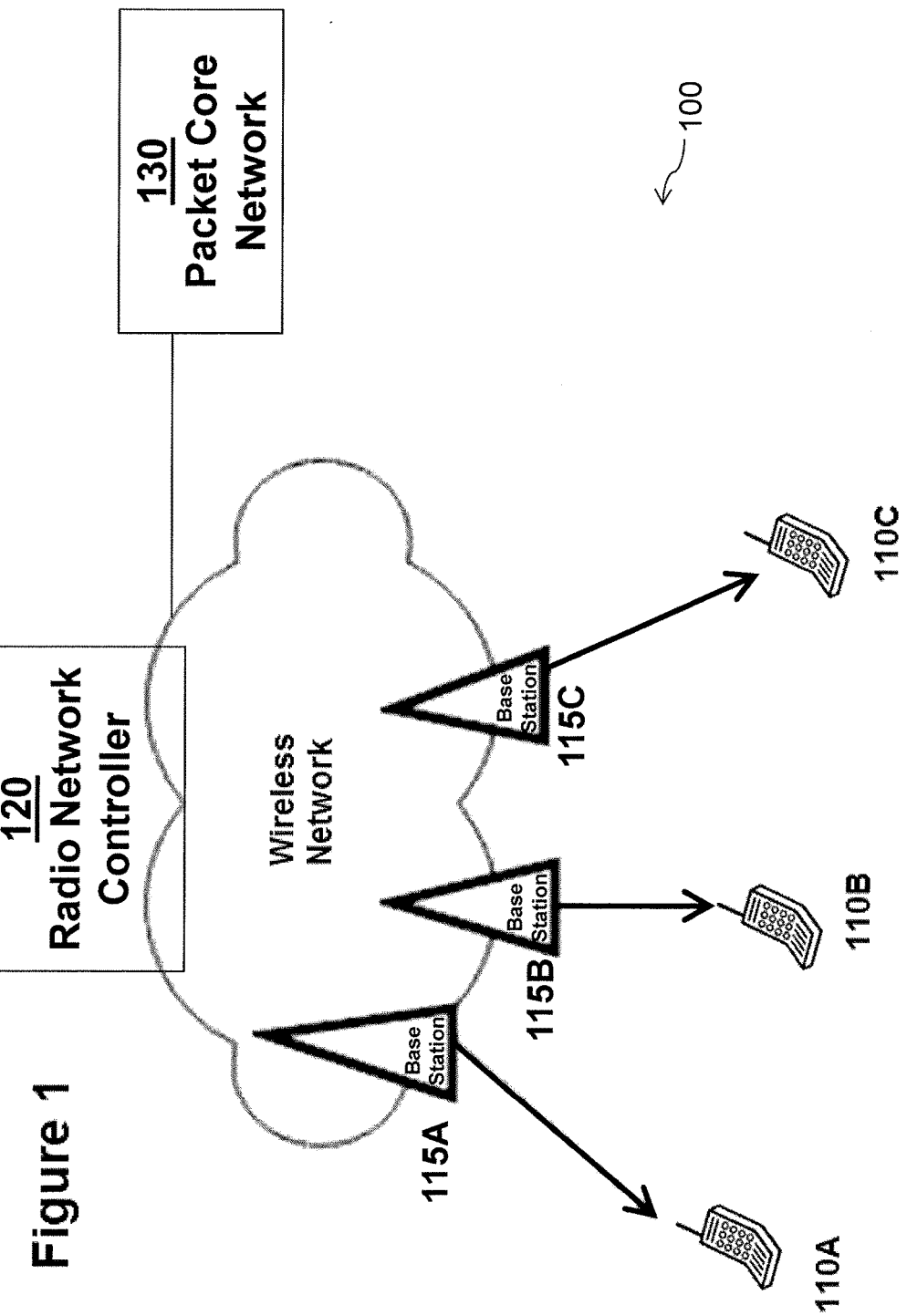
FIG. 1 is a block diagram illustrating an embodiment of a network.
Figure 2:
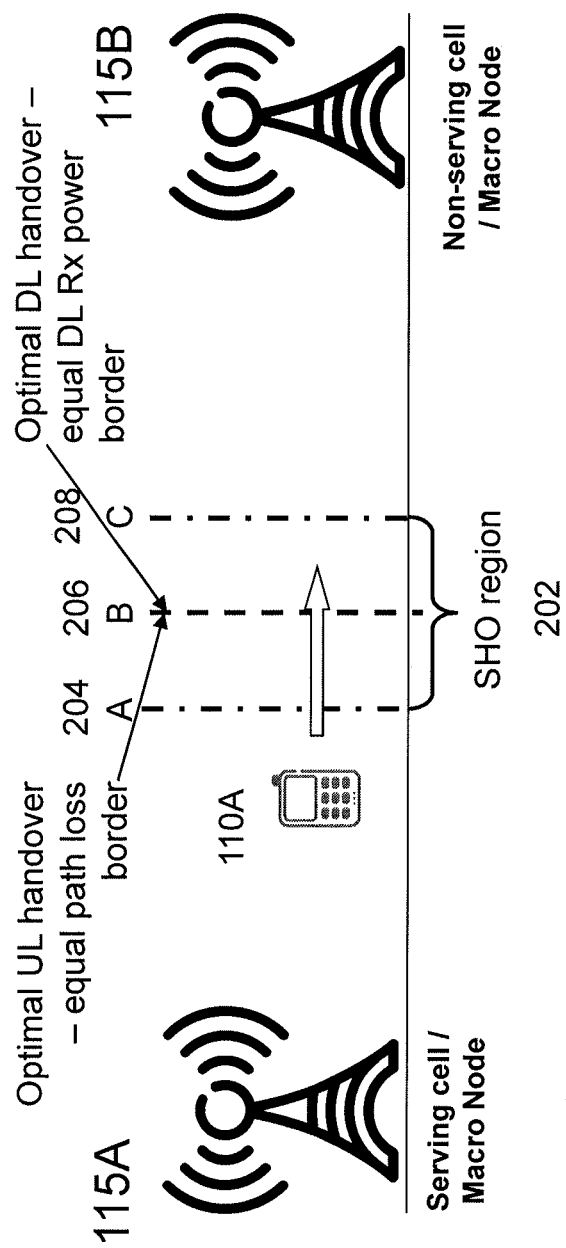
FIG. 2 illustrates a traditional HSPA deployment scenario with two radio access nodes having similar transmit power levels.
Figure 3:
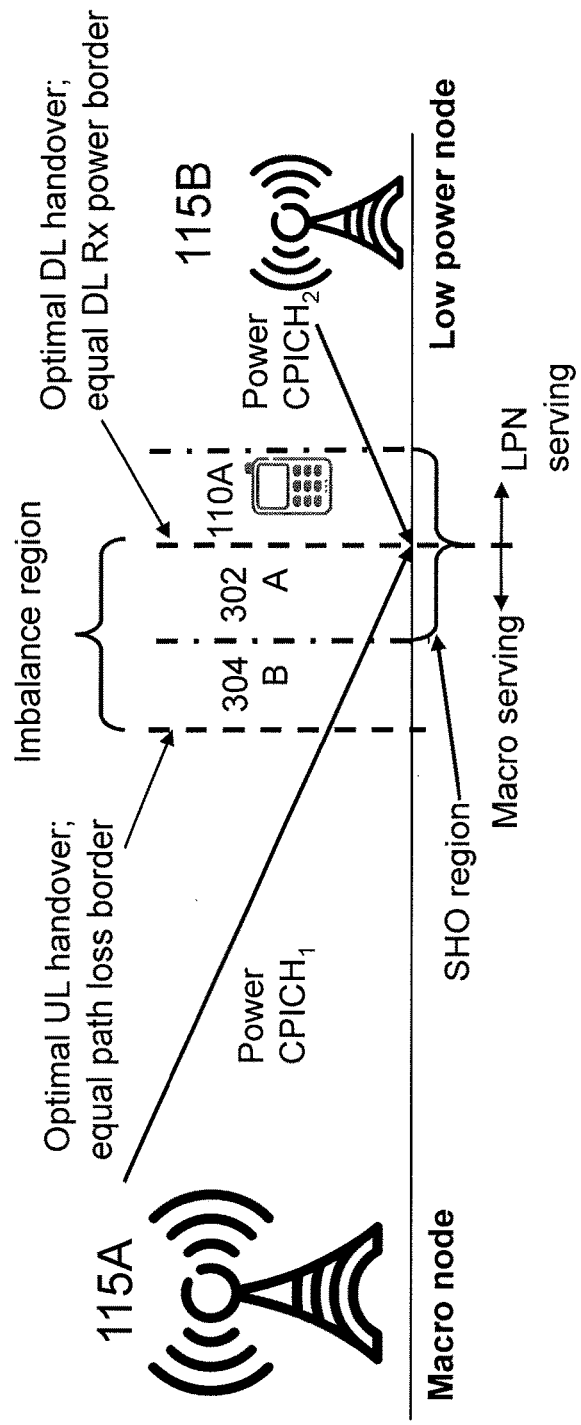
FIG. 3 illustrates a HSPA deployment scenario with two radio access nodes having different transmit power levels.
Figure 4:
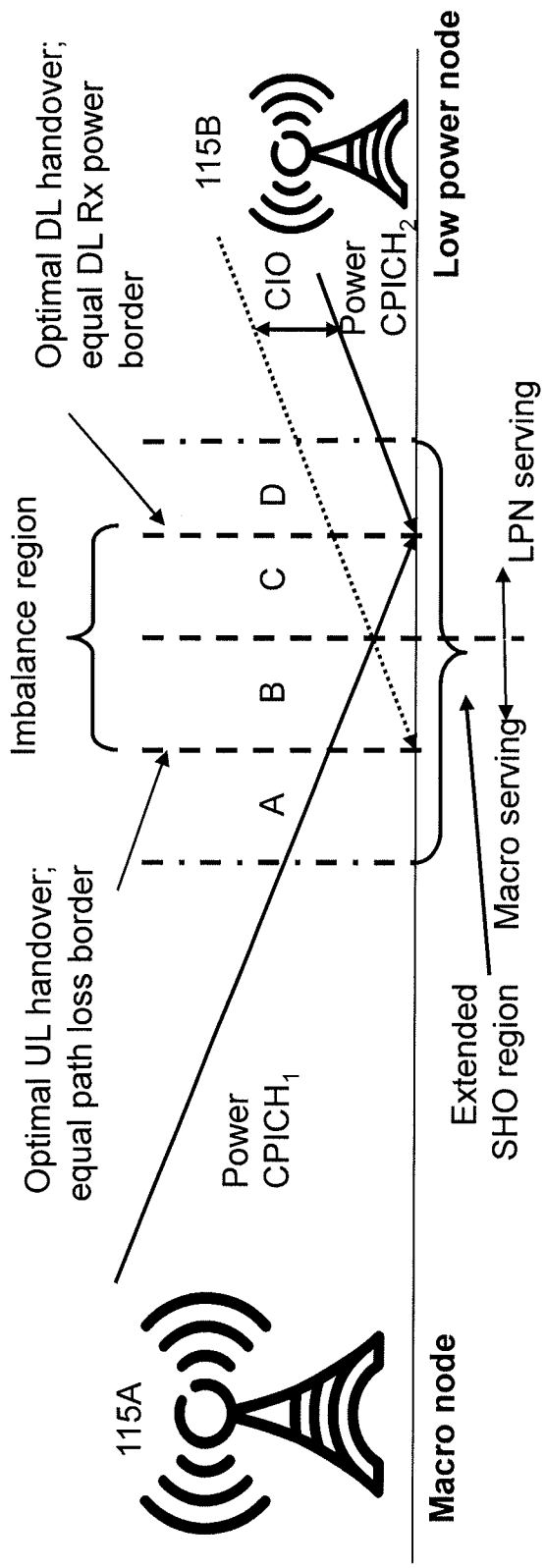
FIG. 4 illustrates SHO operation for HSPA in a heterogeneous deployment with range extension.
Figure 5:
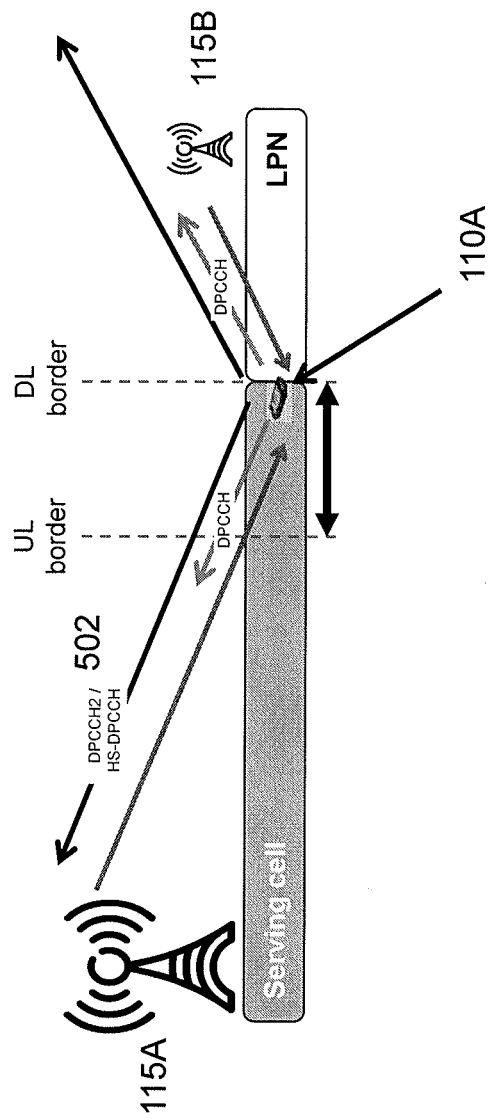
FIG. 5 illustrates a secondary pilot based solution for reception of essential control information on the serving cell side, in accordance with certain embodiments.

FIG. 5 illustrates a secondary pilot based solution for reception of essential control information on the serving cell side, in accordance with certain embodiments. More particularly, FIG. 5 illustrates a macro network node 115A, a LPN 115B, a wireless device 110A, and a secondary pilot channel (DPCCH2) 502. In the scenario illustrated in FIG. 5, macro network node 115A is the serving cell, and LPN 115B is the non-serving cell. In certain embodiments, DPCCH2 502 is an uplink control channel for communicating transmit power control commands. In operation, DPCCH2 may be used for communicating transmit power control commands during soft handover of a wireless device from a network node to a second network node, such as a soft handover of wireless device 110 from macro node 115A to LPN 115B. In certain embodiments, DPCCH2 may be a dedicated physical control channel2 of 3GPP. In certain embodiments, DPCCH2 502 may be used to enhance the reception of essential control information in the serving cell. Although the various embodiments are described primarily in the context of the particular scenario illustrated in FIG. 5, the present disclosure contemplates that the various embodiments may be widely applicable to a variety of scenarios and environments.

As described above, in existing implementations important control channels such as HS-DPCCH and E-DPCCH have a legacy dedicated physical control channel (DPCCH) as their reference channel. The legacy DPCCH may be power controlled toward the non-serving LPN 115B, which can result in problems receiving the essential control information carried in HS-DPCCH and E-DPCCH at the serving macro node 115A. In certain embodiments, DPCCH2 502 is power controlled solely by serving macro cell 115A, and DPCCH2 serves as the phase reference, or as the reference of power (or amplitude) for one or more channels.

Since DPCCH2 may be power controlled solely by serving macro cell 115A, reception of DPCCH2 at serving macro cell 115A is ensured, as is reception of any channel using DPCCH2 502 as its reference channel. Thus, the problems associated with existing implementations described above may be avoided. For example, DPCCH2 502 may be added in the UL as the phase reference for HS-DPCCH, or as the reference of power (or amplitude) setting of HS-DPCCH. HS-DPCCH carries HARQ ACK/NACK feedback for HSDPA. By using DPCCH2 502 as the phase reference, instead of legacy DPCCH, reliable reception of this information at the serving macro cell 115A may be significantly improved. By setting the HS-DPCCH transmit power relative to DPCCH2 502, reception at the serving macro node 115A may be significantly more reliable. In certain embodiments, the transmit power (or amplitude) of HS-DPCCH may be related to that of DPCCH2 502 by an offset value. The offset value may be an extra margin, and the extra margin may be equal to zero.

As another example, DPCCH2 502 may serve as the reference of power (or amplitude) setting of E-DPCCH, instead of the legacy DPCCH. In some cases, the power (or amplitude) of E-DPCCH may be set relative DPCCH2 502 by an offset value. In certain embodiments, E-DPCCH may be set relative to either of the legacy DPCCH and DPCCH2 502. The decision of whether to set E-DPCCH relative DPCCH or DPCCH2 502 may be configured by the network. Non-serving cell(s) 115B may detect E-DPCCH based on DPCCH, DPCCH2 502, or possibly a combination of the two.

Using DPCCH2 502 as the reference channel for E-DPCCH may be advantageous. For example, E-DPCCH may carry out-band uplink related control information. More specifically, serving cell 115A needs to receive at least the happy bit in order to handle grant requests from wireless device 110A. In the worst case, serving cell 115A does not receive the happy bit, no grant will be given to wireless device 110A, and the UL throughput might be completely starved, which in the long run also affects downlink traffic due to impact of UL Transmission Control Protocol (TCP) acknowledgements. As another example, setting the power (or amplitude) of E-DPCCH relative to DPCCH2 502 guarantees reception of the happy bit in serving cell 115A (at least in scenarios with potentially large link imbalances). Setting the E-DPCCH relative DPCCH would likely significantly reduce the detection and demodulation quality of E-DPCCH in serving cell 115A, since the E-DPCCH received power would be too low in serving cell 115A in a scenario with a potentially large link imbalance (i.e., much weaker link towards serving cell 115A than towards at least one of the non-serving cells, such as LPN cell 115B).

Mapping E-DPCCH to the DPCCH2 502 in scenarios with a potentially large link imbalance might result in a larger interference level in non-serving cell(s) 115B (and increased power consumption by wireless device 110) than mapping the E-DPCCH to the DPCCH. The reason may be that the power of DPCCH2 502 may be larger than the power of DPCCH since DPCCH2 502 may only be power controlled by serving cell 115A, while DPCCH is power controlled by all nodes in wireless device 110A's active set, such as serving cell 115A and non-serving cell 115B. Thus, there may be scenarios where it may be better, in terms of, for example, interference level and wireless device 110A transmit power consumption, to set E-DPCCH relative DPCCH.

As one example, if E-DCH decoupling is configured, meaning that one of the non-serving cells, such as LPN cell 115B, will take over as the E-DCH serving cell, then it might be better to keep E-DPCCH relative DPCCH since the happy bit will be reliably received in the serving E-DCH cell 115A. This would reduce the LPN interference compared to mapping E-DPCCH to DPCCH2 502. Hence, there may be benefits of allowing a network configured mapping of E-DPCCH to either DPCCH or DPCCH2 502. In certain embodiments, the mapping can be semi-statically configured via L2/L3 signaling (e.g., RRC signaling) and controlled by the RNC, such as RNC 120 described above in FIG. 1. In certain embodiments, the mapping may be more dynamic based on L1 signaling, e.g., an HS-SCCH order. Dynamic signaling can be useful if the mapping needs to adapt relatively fast due to, for example, the instantaneous or average uplink traffic/load situation, or the interference situation.

Certain embodiments may provide improvements to the proposed solution using DPCCH2 502. For example, it may be desirable to determine and set a signal interference target for DPCCH2 502. Such a signal interference target may be controlled by the outer-loop power control (OLPC) based on the quality any suitable channel. For example, in certain embodiments the signal interference target may be controlled by the OLPC based on the quality of the data (E-DPDCH) channel. As another example, the signal interference target may be controlled by the OLPC based on the quality of HS-DPCCH and/or E-DPCCH, depending on whether E-DPCCH is mapped relative to DPCCH2 502. The signal interference target may be a signal-to-interference ratio (SIR), a signal-to-noise ratio (SNR), or a signal-to-interference-and-noise ratio (SINR). The OLPC is typically placed in an RNC, such as RNC 120 described above in relation to FIG. 1.

The present disclosure contemplates various embodiments for setting the signal interference target for DPCCH2 502. As described above, DPCCH2 502 may be power controlled only by serving cell 115A. Hence, the DPCCH2 502 signal interference target need in principle only be available in serving node 115A. Hence, serving node 115A can determine and set an appropriate DPCCH2 502 signal interference target. In particular embodiments, however, a controlling node, such as an RNC, may be in control of determining and setting the DPCCH2 502 signal interference target. In such an embodiment, the RNC may inform serving node 115A about the signal interference target value. As described herein, the term controlling node is used as a reference to the node (e.g., a Node B, RNC, or any other suitable node) that is in control of setting the signal interference target. As one example, the controlling node may be serving node 115A. As another example, the controlling node may be an RNC. Instead of having a DPCCH2 502 signal interference target, it is equally possible to have a HS-DPCCH (or E-DPCCH) signal interference target. In certain embodiments, an appropriate signal interference target may be ensured by implementing an OLPC mechanism in the controlling node.

If the sole intention with DPCCH2 502 is to ensure HS-DPCCH quality, then it may be the HS-DPCCH signal interference quality, and not the E-DPDCH quality that matters. If, on the other hand, E-DPCCH is also set relative DPCCH2 502, then it may be both the quality of HS-DPCCH and E-DPCCH in serving cell 115A that matters. In certain embodiments, the controlling node, such as serving node 115A or RNC 120, can keep two different signal interference targets, one for HS-DPCCH and one for E-DPCCH, and let the power of DPCCH2 502 be compared relative the combined signal interference target, where the combination typically would be the largest of the two signal interference targets.

Another improvement to the proposed secondary pilot solution contemplated by the present disclosure relates to how to set the initial power of DPCCH2 502 when initiating the transmission of DPCCH2 502. In particular embodiments, the objective may be to guarantee that the receive power of DPCCH2 502 is reasonable in serving cell 115A as soon as possible, to ensure that the power control loop of DPCCH2 502 works (cf. synchronisation). Thus, the power of DPCCH2 502 may initially equal the power of DPCCH. This approach may work very well if, for example, DPCCH2 502 is enabled as soon as entering SHO (and serving cell 115A remains the same).

In certain embodiments, some extra margin might be needed. As one example, some extra margin might be needed if DPCCH2 502 is enabled due to a weak link towards serving cell 115A when already in SHO. In such a case, the power of DPCCH2 502 can be set to equal the power of DPCCH plus an extra margin. In particular embodiments, the extra margin may be an offset value. The extra margin may be equal to zero. In certain embodiments, there may be some intelligence in this procedure. As one example, wireless device 110A may use knowledge of the number of TPC UP requests compared to the number of TPC DOWN requests from serving cell 115A to infer some intelligence in how to set the extra margin. In such an embodiment, wireless device 110A may also need to take into consideration the TPC requests from non-serving cells, such as LPN cell 115B. In certain embodiments, many TPC DOWN requests from non-serving cell 115B and TPC UP requests from serving cell 115A implies that a larger offset may be required.

As described above, other relevant channels, such as HS-DPCCH and E-DPCCH may be set using DPCCH2 502 as a reference. Another related aspect to the secondary pilot solution, therefore, is whether DPCCH2 502 should reach a certain quality target before other relevant channels are set relative to it. Since DPCCH2 502 uses a separate power control loop, it may be desirable to ensure synch of the loop (i.e., a reasonable quality target) before beginning to operate it. In certain embodiments, DPCCH2 502 may be enabled first, and when it has reached its quality level (e.g., signal interference target), the HS-DPCCH (and/or E-DPCCH) is set relative DPCCH2. On the other hand, since the DPCCH is most likely in sync already when DPCCH2 502 is activated, it should be able to ensure immediate sync for DPCCH2 without any special considerations. As described above, in particular embodiments, the power of DPCCH2 502 could initially be set relative DPCCH plus a safety margin.

In certain embodiments, standardized functionality called continuous packet connectivity (CPC) may be used. One part of CPC enables wireless device 110A to turn off the transmitted DPCCH, and thus all other channels as the power is related to the DPCCH. This may be used both to save battery for wireless device 110A, and minimize interference to other wireless devices, such as wireless devices 110B and 110C described above in relation to FIG. 1, in the wireless device-interface. A similar approach may be relevant to DPCCH2 502. Since the DPCCH2 502 power setting may not be related to the DPCCH channel, some improvements to the current discontinuous transmission (DTX) scheme for DPCCH may be made.

In certain embodiments, DPCCH2 502 operation may be controlled by the existing DTX pattern for DPCCH. As there currently may exist a timing offset between the existing DPCCH and HS-DPCCH channel, a similar timing difference may exist between DPCCH and DPCCH2 502. Thus, it may be beneficial to have the ability to send a separate DTX pattern for DPCCH2 502. In such an embodiment, certain advantages over the current scheme may result. As one example, the advantages may include explicitly signaling the number of DPCCH2 502 slots to be transmitted prior to transmission of HS-DPCCH. This may improve on an existing solution for DPCCH in which only 2, 4, or 15 slots may be used prior to transmission of other channels. If the power of E-DPCCH is configured to be relative DPCCH2 502, the number of DPCCH2 502 slots (preambles) to be transmitted prior to transmission of HS-DPCCH or E-DP-CCH can be signaled by RRC messaging, or be signaled on L1 by means of, for example, HS-SCCH order. This may support faster changes that may be beneficial as the channel conditions or interference level performs fast changes. In certain embodiments, similar considerations may be used for DPCCH2 502 slots (postambles) sent after transmission of HS-DPCCH and/or E-DPCCH.

As another potential improvement to the proposed secondary pilot based solution, special handling of DPCCH2 502 can be envisioned for uplink multicarrier (DC-HSUPA) operation. If the intention is to only protect the HS-DPCCH, it may not be necessary to configure DPCCH2 502 on the secondary uplink carrier since HS-DPCCH is only carried on the primary UL carrier. However, in certain embodiments, if the E-DPCCH for the secondary carrier needs to be protected (e.g., to ensure that the happy bit is received in serving cell 115A), DPCCH2 502 may need to be configured in the secondary uplink carrier as well. Hence, it may be beneficial to have independent handling of DPCCH2 502 for the different uplink carriers.

As described above, E-DPDCH may be set relative to legacy DPCCH. As yet another potential improvement to the secondary pilot solution described herein, in particular embodiments, DPCCH2 502 may be used to ensure the reception of in-band scheduling information carried on the E-DPDCH. In such an embodiment, the E-DPDCH would be set relative DPCCH2 502 as well. The general data payload carried on E-DPDCH is under macro diversity, and hence does not need to be reliably received in serving cell 115A. Thus, to limit the interference generated by the E-DPDCH, it may be beneficial to only set E-DPDCH relative DPCCH2 502 when sending scheduling information. When E-DPDCH is not carrying scheduling information, E-DPDCH may be set relative legacy DPCCH. Transmission of scheduling information, such as stand-alone scheduling information, will use very low gain factors (e.g., amplitude or beta_ed), and be transmitted rather seldom. Hence, if E-DPDCH is set relative DPCCH2 502 only in these cases, the interference is likely to be low. In certain embodiments, when to transmit stand-alone scheduling information, or rather when to set E-DPDCH relative DPCCH2 502, may be pre-configured so that all relevant nodes (such as wireless device 110A and serving cell 115A) know when E-DPDCH should be set relative DPCCH2 502. The beta_ed factors to use may be set differently depending on what information is sent (data or scheduling information), and/or depending on whether E-DPDCH is set relative DPCCH or DPCCH2 502.

Yet another improvement to the proposed secondary pilot solution relates to the need for a secondary inner loop power control (ILPC) loop for DPCCH2 502. More specifically, the secondary pilot solution may have a need for a way to convey on the DL the UL TPC command to be used by wireless device 110A to power control DPCCH2 502. In particular embodiments, the TPC commands may be carried on a fractional dedicated physical channel (F-DPCH) in the DL (as is described below). The present disclosure contemplates various embodiments for improving conveyance of TPC commands on the downlink.

As an example, one additional spreading code may be allocated to a second F-DPCH. In such an embodiment, the two ILPC loops associated with DPCCH and DPCCH2 502 may use different F-DPCHs. This may allow TPC commands associated with DPCCH and DPCCH2 502 to use the same F-DPCH slot format, i.e., the same timing.

As another example, an additional slot format for conveying TPC commands associated with DPCCH2 502 may be allocated. In particular embodiments, the TPC commands associated with DPCCH and DPCCH2 502 may be time-multiplexed. That is, TPC commands associated with DPCCH and DPCCH2 502 may be sent in alternating slots. As one example, TPC commands associated with DPCCH may be sent in even slots, and TPC commands associated with DPCCH2 502 may be sent in odd slots.

In certain embodiments, the existing F-DPCH may be changed or re-interpreted. For example, the current slot formats contain two information bits per slot. One of the bits may, therefore, represent the TPC command associated with DPCCH, and the other bit may represent the TPC command associated with DPCCH2 502. As another example, the spreading factor for F-DPCH may be reduced to get more information bits per slot. As yet another example, the modulation order for F-DPCH may be changed to fit more information bits into each slot.

Figure 6:
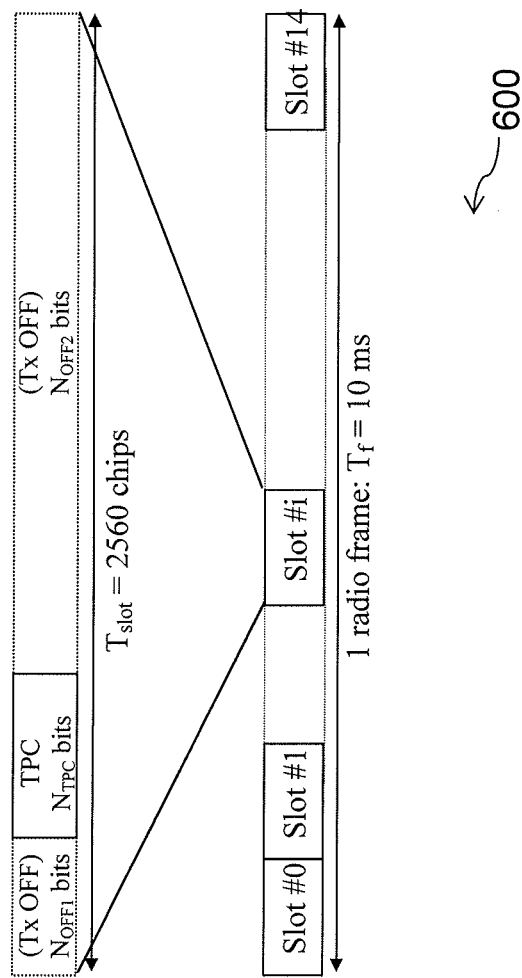
FIG. 6 depicts the frame structure of the fractional dedicated physical channel, in accordance with certain embodiments.

FIG. 6 depicts the frame structure 600 of the F-DPCH, in accordance with certain embodiments. In the example, each frame of length 10 ms is split into 15 slots, each of length $T_{slot}$=2560 chips, corresponding to one power-control period. The exact number of bits of the OFF periods and of the F-DPCH fields ($N_{TPC}$) is described in Table 1. Each slot format corresponds to a different set of OFF periods within the F-DPCH slot.

TABLE 1

F-DPCH fields

| Slot Format #i | Channel Bit Rate (kbps) | Channel Symbol Rate (ksps) | SF | Bits/ Slot | $N_{OFF1}$ Bits/ Slot | $N_{TPC}$ Bits/ Slot | $N_{OFF2}$ Bits/ Slot |
|---|---|---|---|---|---|---|---|
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

Figure 7:
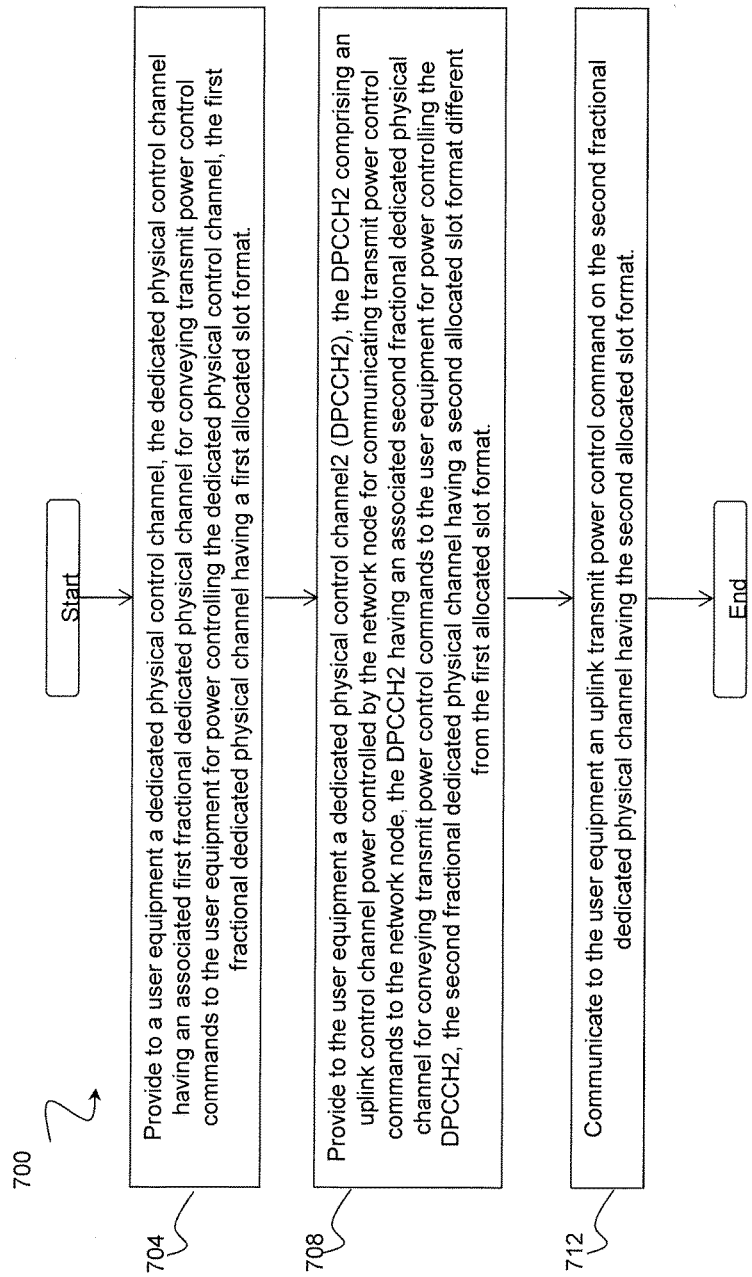
FIG. 7 is a flow diagram illustrating an example method in a network node, according to a particular embodiment.

FIG. 7 is a flow diagram illustrating an example method 700 in a network node, according to a particular embodiment. The method begins at step 704, where the network node provides to a user equipment a dedicated physical control channel. The dedicated physical control channel has an associated first fractional dedicated physical channel for conveying transmit power control commands to the user equipment for power controlling the dedicated physical control channel. The first fractional dedicated physical channel has a first allocated slot format. In certain embodiments, the first fractional dedicated physical channel may have an associated first spreading code. The network node may be a serving node currently serving the user equipment, and the user equipment may be a wireless device.

At step 708, the network node provides to the user equipment a dedicated physical control channel2 (DP-CCH2). The DPCCH2 comprises an uplink control channel power controlled by the network node for communicating transmit power control commands to the network node. The DPCCH2 has an associated second fractional dedicated physical channel for conveying transmit power control commands to the user equipment for power controlling the DPCCH2. The second fractional dedicated physical channel has a second allocated slot format different from the first allocated slot format. In certain embodiments, the second fractional dedicated physical channel may have an associated second spreading code. Operation of the DPCCH2 may be controlled by a discontinuous transmission pattern of the dedicated physical control channel, and the DPCCH2 may only be transmitted when the dedicated physical control channel is transmitted. The DPCCH2 may be configured only on a primary uplink carrier.

In certain embodiments, the dedicated physical control channel may have a first power level, and the method may further include setting an initial power level for the DPCCH2. The initial power level may be equal to the first power level plus an extra margin. The extra margin may be zero. The initial power level for the DPCCH2 may be set upon initiating transmission of the DPCCH2. The initial power level may be based at least in part on a comparison of a number of transmit power control uplink requests and a number of transmit power downlink requests from a serving cell.

At step 712, the network node communicates to the user equipment an uplink transmit power control command on the second fractional dedicated physical channel having the second allocated slot format.

Figure 8:
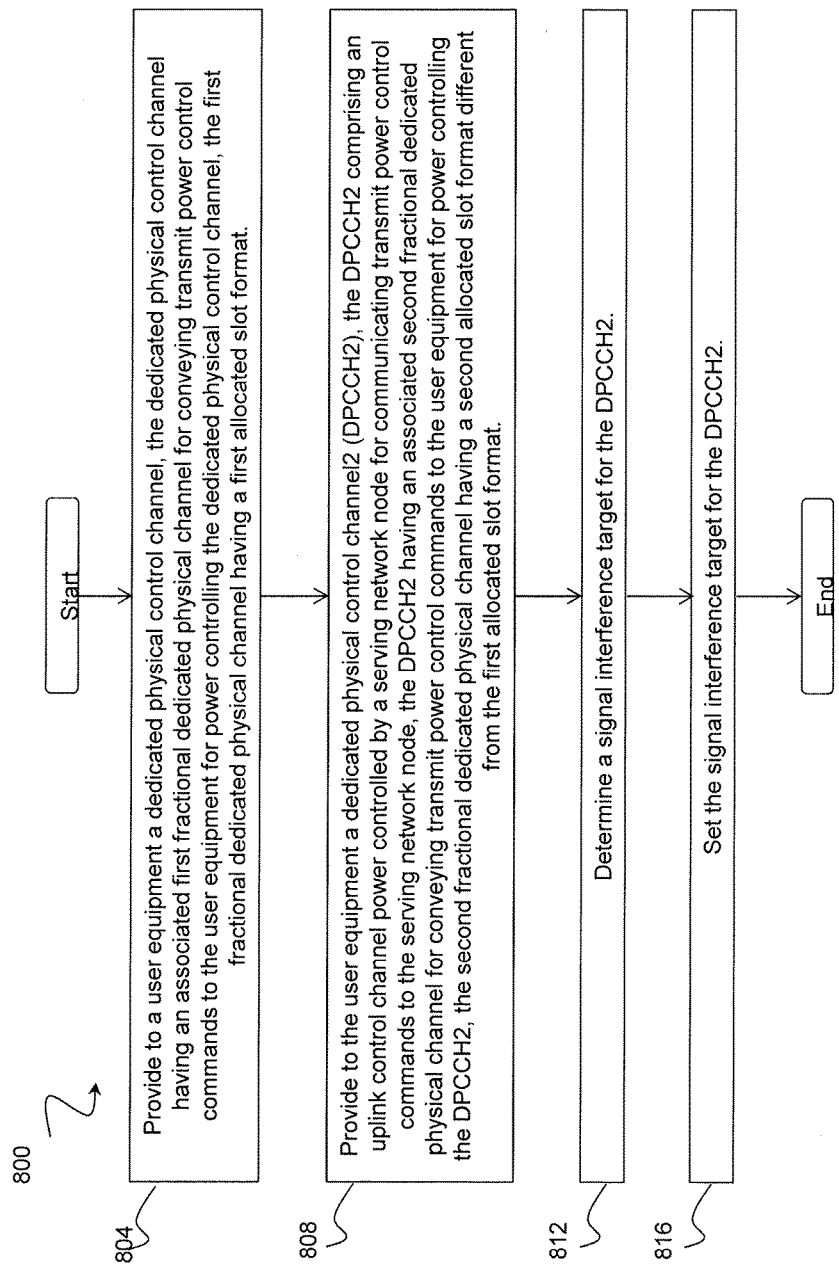
FIG. 8 is a flow diagram illustrating an example method in a wireless communications system, according to a particular embodiment.

FIG. 8 is a flow diagram illustrating an example method 800 in a wireless communications system, according to a particular embodiment. The method begins at step 804, where a dedicated physical control channel is provided to a user equipment. The dedicated physical control channel has an associated first fractional dedicated physical channel for conveying transmit power control commands to the user equipment for power controlling the dedicated physical control channel. The first fractional dedicated physical channel has a first allocated slot format.

At step 808, a dedicated physical control channel2 (DPCCH2) is provided to the user equipment. The DPCCH2 comprises an uplink control channel power controlled by a serving network node for communicating transmit power control commands to the serving network node. The DPCCH2 has an associated second fractional dedicated physical channel for conveying transmit power control commands to the user equipment for power controlling the DPCCH2. The second fractional channel has a second allocated slot format different from the first allocated slot format.

At step 812, a signal interference target for the DPCCH2 is determined. At step 816, the signal interference target is set for the DPCCH2. In certain embodiments, the signal interference target is one of a signal-to-interference ratio, a signal-to-noise ratio, and a signal-to-interference-and-noise ratio. The steps of determining a signal interference target for the DPCCH2 and setting the signal interference target for the DPCCH2 may be performed by the serving network node. The steps of determining a signal interference target for the DPCCH2 and setting the signal interference target for the DPCCH2 may be performed by a radio network controller, and the method may further comprise informing the serving network node of the signal interference target for the DPCCH2.

Figure 9:
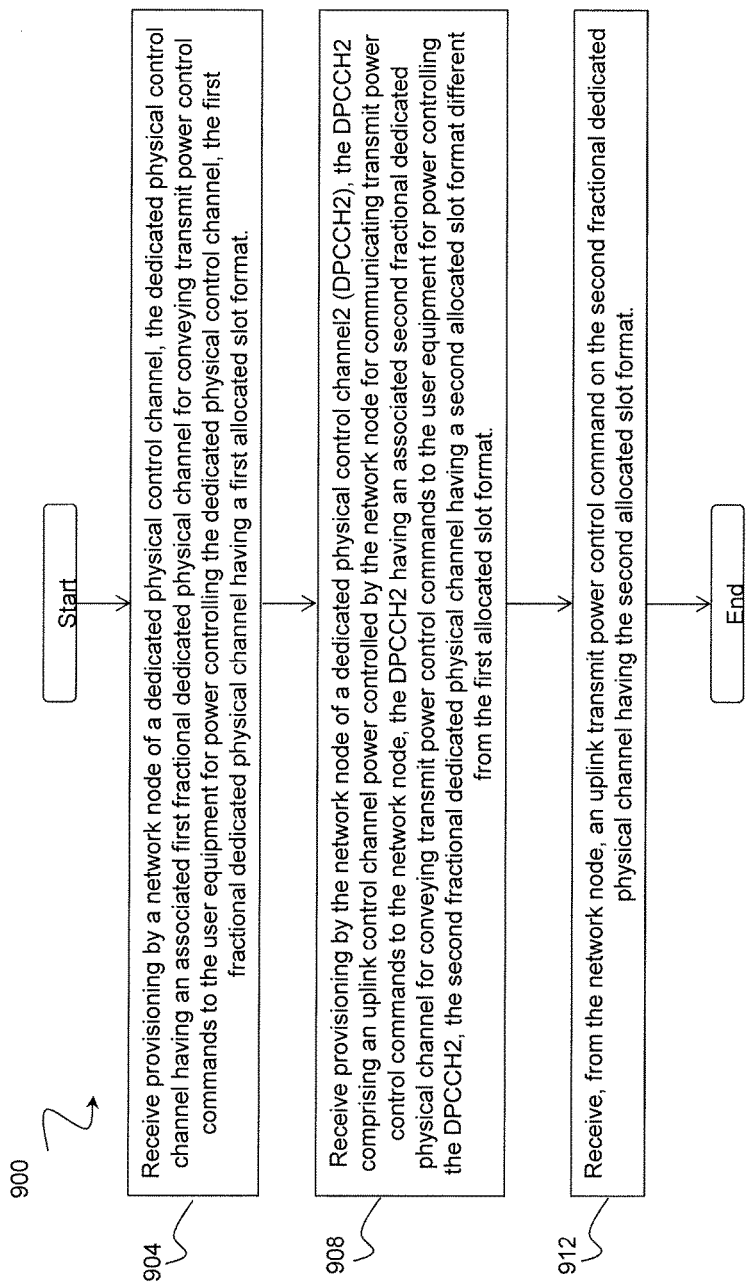
FIG. 9 is a flow diagram illustrating an example method in a user equipment, according to a particular embodiment.

FIG. 9 is a flow diagram illustrating an example method 900 in a user equipment, according to a particular embodiment. The method begins at step 904, where the user equipment receives provisioning by a network node of a dedicated physical control channel. The dedicated physical control channel has an associated first fractional dedicated physical channel for conveying transmit power control commands to the user equipment for power controlling the dedicated physical control channel. The first fractional dedicated physical channel has a first allocated slot format. In certain embodiments, the first fractional dedicated physical channel may have an associated first spreading code.

At step 908, the user equipment receives provisioning by the network node of a dedicated physical control channel2 (DPCCH2). The DPCCH2 comprises an uplink control channel power controlled by the network node for communicating transmit power control commands to the network node. The DPCCH2 has an associated second fractional dedicated physical channel for conveying transmit power control commands to the user equipment for power controlling the DPCCH2. The second fractional dedicated physical channel has a second allocated slot format different from the first allocated slot format. In certain embodiments, the second fractional dedicated physical channel may have an associated second spreading code. Operation of the DPCCH2 may be controlled by a discontinuous transmission pattern of the dedicated physical control channel, and the DPCCH2 may only be transmitted when the dedicated physical control channel is transmitted. The DPCCH2 may be configured only on a primary uplink carrier.

In certain embodiments, the dedicated physical control channel may have a first power level, and the method may further include setting an initial power level for the DPCCH2. The initial power level may be equal to the first power level plus an extra margin. The extra margin may be zero. The initial power level for the DPCCH2 may be set upon initiating transmission of the DPCCH2. The initial power level may be based at least in part on a comparison of a number of transmit power control uplink requests and a number of transmit power downlink requests from a serving cell.

At step 912 the user equipment receives, from the network node, an uplink transmit power control command on the second fractional dedicated physical channel having the second allocated slot format.

As described above in relation to FIG. 1, embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone).

Wireless device 110, radio network node 115, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as WCDMA. However, the scope of the disclosure is not limited to the examples and other embodiments could use different radio access technologies. Each of wireless device 110, radio network node 115, radio network controller 120, and core network node 130 may include any suitable combination of hardware and/or software. Examples of particular embodiments of wireless device 110, radio network node 115, and network nodes (such as radio network controller 120 or core network node 130) are described with respect to FIGS. 10, 11, and 12 below, respectively.

Figure 10:
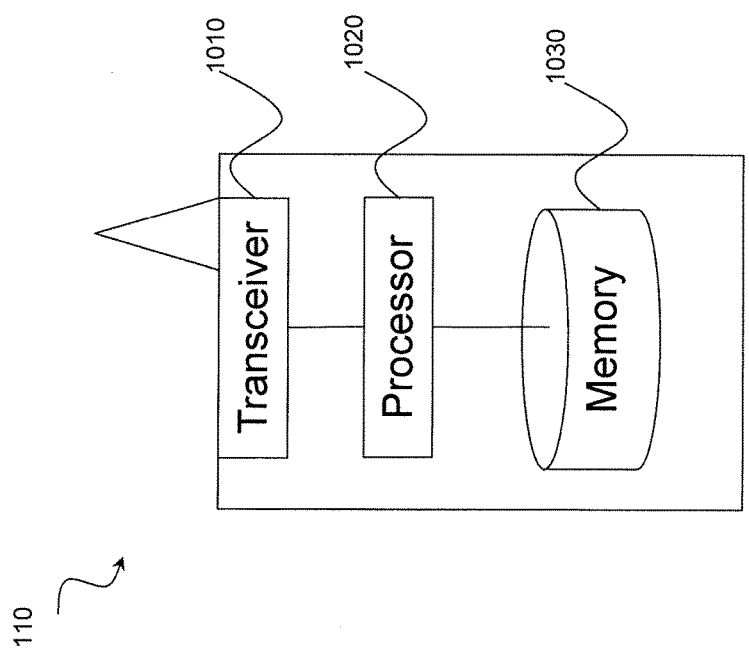
FIG. 10 is a block diagram illustrating certain embodiments of a wireless device.

FIG. 10 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1010, processor 1020, and memory 1030. In some embodiments, transceiver 1010 facilitates transmitting wireless signals to and receiving wireless signals from radio network node 120 (e.g., via an antenna), processor 1020 executes instructions to provide some or all of the functionality described above as being provided by wireless device 110, and memory 1030 stores the instructions executed by processor 1020.

Processor 1020 may include any suitable combination of hardware and software implemented in one or more modules to execute instructions and manipulate data to perform some or all of the described functions of wireless device 110. In some embodiments, processor 1020 may include, for example, one or more computers, one or more programmable logic devices, one or more central processing units (CPUs), one or more microprocessors, one or more applications, other logic, and/or any suitable combination of the preceding. Processor 1020 may include analog and/or digital circuitry configured to perform some or all of the described functions of mobile device 105. For example, processor 1020 may include resistors, capacitors, inductors, transistors, diodes, and/or any other suitable circuit components.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above).

In certain embodiments, wireless device 110 may include a determining module, a communication module, a receiver module, an input module, a display module, and any other suitable modules. The determining module may perform the processing functions of wireless device 110. For example, the determining module may set an initial power level associated with DPCCH2 based on that information. The determining module may include or be included in processor 1020. The determining module may include analog and/or digital circuitry configured to perform any of the functions of the determining module and/or processor 1020.

The communication module may perform the transmission functions of wireless device 110. For example, the communication module may communicate essential control channel information, such as HARQ, ACK, and NACK, feedback for HSDPA, and scheduling information for EUL to the serving cell. As another example, the communication module may transmit messages to one or more of radio network nodes 115A-C of network 100. The communication module may include a transmitter and/or a transceiver, such as transceiver 1010. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may receive an UL TPC command on the second fractional dedicated physical channel having the second allocated slot format. As another example, the receiving module may receive messages from network nodes 115A-C of network 100. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 11:
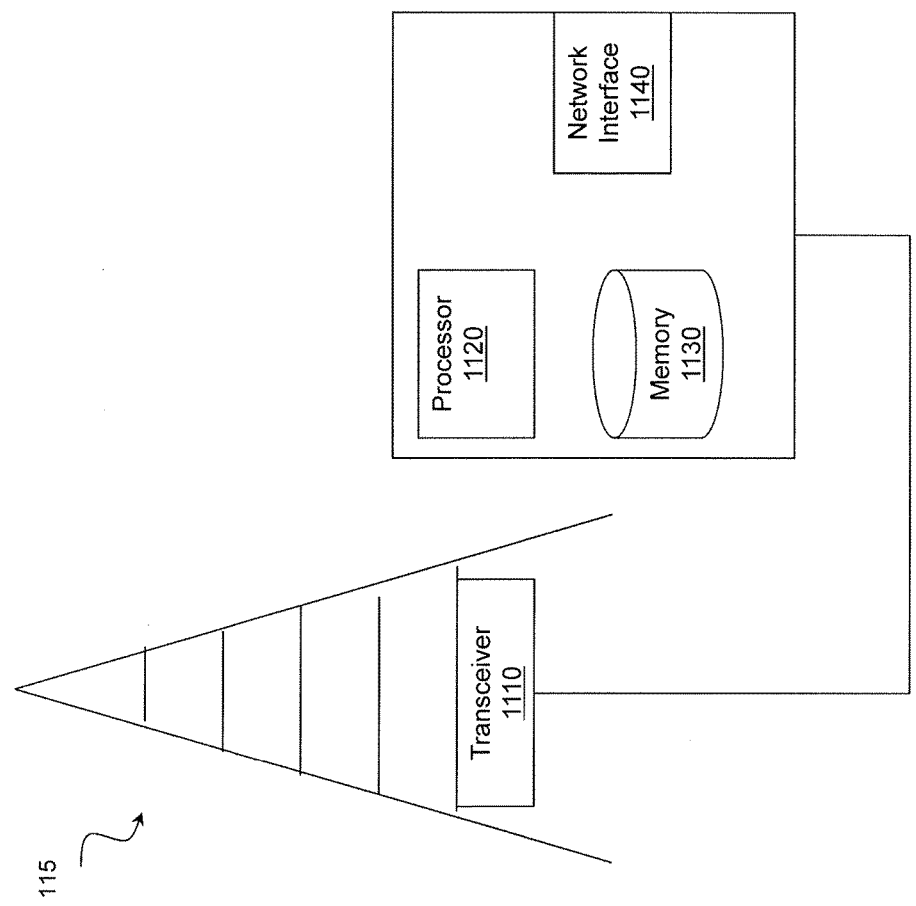
FIG. 11 is a block diagram illustrating certain embodiments of a radio network node.

FIG. 11 is a block diagram illustrating certain embodiments of a radio network node 115. Examples of radio network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115 may be deployed throughout network 100 as a homogenous deployment, heterogeneous deployment, or mixed deployment. A homogeneous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 1110, processor 1120, memory 1130, and network interface 1140. In some embodiments, transceiver 1110 facilitates transmitting wireless signals to and receiving wireless signals from wireless device 110 (e.g., via an antenna), processor 1120 executes instructions to provide some or all of the functionality described above as being provided by a radio network node 115, memory 1130 stores the instructions executed by processor 1120, and network interface 1140 communicates signals to backend network components, such as a gateway, switch, router, Internet, Public Switched Telephone Network (PSTN), core network nodes 130, radio network controllers 120, etc.

Processor 1120 may include any suitable combination of hardware and software implemented in one or more modules to execute instructions and manipulate data to perform some or all of the described functions of radio network node 115. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for radio network node 115, send output from radio network node 115, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

In certain embodiments, radio network node 115 may include a dedicated physical control channel provisioning module, a dedicated physical control channel2 provisioning module, a communication module, a determining module, and any other suitable modules. In some embodiments, one or more of dedicated physical control channel provisioning module, dedicated physical control channel2 provisioning module, communication module, determining module, or any other suitable module may be implemented using one or more processors 1120 of FIG. 11.

In general, the dedicated physical control channel module may provide a dedicated physical control channel to a user equipment, and the dedicated physical control channel2 module may provide a dedicated physical control channel2 to the user equipment. In certain embodiments, the functions of the dedicated physical control channel module and the dedicated physical control channel2 module may be combined into a single module. The communication module may communicate to the user equipment an uplink transmit power control command on the second fractional dedicated physical channel having the second allocated slot format. In particular embodiments, the determining module may determine a signal interference target for dedicated physical control channel2 provisioned by the dedicated physical control channel2 module, and set the signal interference target for dedicated physical control channel2. The receiving module may receive essential control information from a user equipment, such as HARQ, ACK, and NACK, feedback for HSDPA, and scheduling information for enhanced uplink to the serving cell.

Other embodiments of radio network node 115 may include additional components beyond those shown in FIG. 11 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 12:
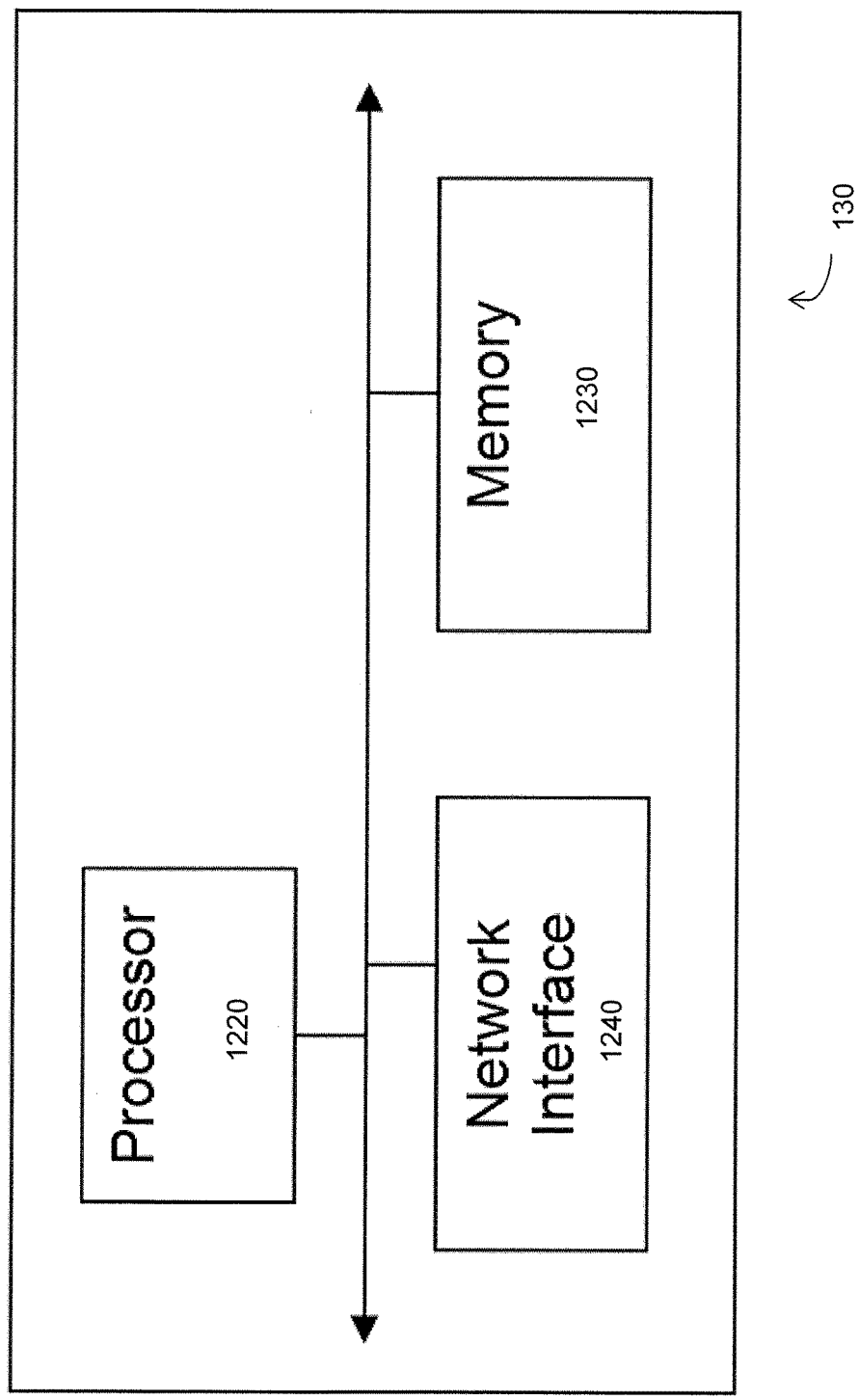
FIG. 12 is a block diagram illustrating certain embodiments of a core network node.

FIG. 12 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 1220, memory 1230, and network interface 1240. In some embodiments, processor 1220 executes instructions to provide some or all of the functionality described above as being provided by the network node, memory 1230 stores the instructions executed by processor 1220, and network interface 1240 communicates signals to a suitable node, such as a gateway, switch, router, Internet, Public Switched Telephone Network (PSTN), radio network nodes 115, radio network controllers 120, core network nodes 130, etc.

Processor 1220 may include any suitable combination of hardware and software implemented in one or more modules to execute instructions and manipulate data to perform some or all of the described functions of the network node. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 12 that may be responsible for providing certain aspects of the network node's functionality, including any of the functionality described above and/or any additional functionality (including any functionality necessary to support the solution described above).

In an example embodiment, a method in a wireless communications system is disclosed. The method may comprise providing to a user equipment a dedicated physical control channel, the dedicated physical control channel having an associated first fractional dedicated physical channel for conveying transmit power control commands to the user equipment for power controlling the dedicated physical control channel, the first fractional dedicated physical channel having a first allocated slot format. The method may comprise providing to the user equipment a dedicated physical control channel2 (DPCCH2), the DPCCH2 comprising an uplink control channel power controlled by a serving network node for communicating transmit power control commands to the serving network node, the DPCCH2 having an associated second fractional dedicated physical channel for conveying transmit power control commands to the user equipment for power controlling the DPCCH2, the second fractional dedicated physical channel having a second allocated slot format different from the first allocated slot format. The method may further comprise determining a signal interference target for the DPCCH2 and setting the signal interference target for the DPCCH2.

In certain embodiments, the signal interference target is one of a signal-to-interference ratio, a signal-to-noise ratio, and a signal-to-interference-and-noise ratio. The steps of determining a signal interference target for the DPCCH2 and setting the signal interference target for the DPCCH2 may be performed by the serving network node. The steps of determining a signal interference target for the DPCCH2 and setting the signal interference target for the DPCCH2 may be performed by a radio network controller, and the method may further comprise informing the serving network node of the signal interference target for the DPCCH2.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
HSPA High Speed Packet Access
HSDPA High Speed Downlink Packet Access
EUL Enhanced Uplink
DPCCH Dedicated Physical Control Channel
DPCCH2 Secondary Pilot Channel/Dedicated Physical Control Channel2
E-DCH Enhanced Dedicated Channel
E-DPDCH E-DCH Dedicated Physical Data Channel
E-DPCCH E-DCH Dedicated Physical Control Channel
HS-DPCCH High Speed Downlink Packet Access
MIMO Multiple input multiple output
HARQ Hybrid automatic repeat request
NAK Negative acknowledgement
ACK Positive acknowledgement
E-RGCH E-DCH Relative Grant Channel
TTI Transmission Time Interval
RNC Radio Network Controller
RRC Radio Resource Control
LPN Low-power node
RRU Remote Radio Unit
CPICH Common Pilot Channel
CIO Cell Individual Offset
F-DPCH Fractional Dedicated Physical Channel
HS-SCCH Shared Control Channel for HS-DSCH
E-AGCH E-DCH Absolute Grant Channel
SIR Signal-to-interference ratio
SNR Signal-to-noise ratio
SINR Signal-to-interference-and-noise ratio
Tx Transmit
Rx Receive
TBS Transport block size
RLC Radio Link Control
WCDMA Wideband Code Division Multiple Access
SHO Soft handover
UL Uplink
DL Downlink
HSPA High Speed Packet Access
TPC Transmit power control
ILPC Inner-loop power control
OLPC Outer-loop power control

The invention claimed is:

1. A method for controlling uplink transmit power in a network node, comprising:
providing to a user equipment a dedicated physical control channel (DPCCH), the dedicated physical control channel having an associated first fractional dedicated physical channel for conveying DPCCH transmit power control commands to the user equipment for power controlling the dedicated physical control channel, the first fractional dedicated physical channel having a first allocated slot format;
providing to the user equipment a dedicated physical control channel2 (DPCCH2), the DPCCH2 comprising an uplink control channel power controlled by the network node for communicating DPCCH2 downlink transmit power control commands to the network node, the DPCCH2 having an associated second fractional dedicated physical channel for conveying DPCCH2 uplink transmit power control commands to the user equipment for power controlling the DPCCH2, the second fractional dedicated physical channel having a second allocated slot format different from the first allocated slot format;
communicating to the user equipment at least one of the DPCCH2 uplink transmit power control commands on the second fractional dedicated physical channel having the second allocated slot format; and
setting an initial power level for the DPCCH2, wherein the initial power level for the DPCCH2 is based at least in part on a comparison of a number of transmit power control uplink requests and a number of transmit power control downlink requests from a serving cell.

2. The method of claim 1, wherein:
the first fractional dedicated physical channel has an associated first spreading code; and
the second fractional dedicated physical channel has an associated second spreading code.

3. The method of claim 1, wherein the initial power level for the DPCCH2 is equal to a first power level of the DPCCH plus an extra margin.

4. The method of claim 1, wherein operation of the DPCCH2 is controlled by a discontinuous transmission pattern of the dedicated physical control channel, and the DPCCH2 is only transmitted when the dedicated physical control channel is transmitted.

5. The method of claim 1, wherein the DPCCH2 is configured only on a primary uplink carrier.

6. A network node, comprising:
one or more processors configured to:
configure a dedicated physical control channel (DPCCH) for a user equipment, the dedicated physical control channel having an associated first fractional dedicated physical channel for conveying DPCCH transmit power control commands to the user equipment for power controlling the dedicated physical control channel, the first fractional dedicated physical channel having a first allocated slot format; and
configure a dedicated physical control channel2 (DPCCH2) for the user equipment, the DPCCH2 comprising an uplink control channel power controlled by the network node for communicating DPCCH2 downlink transmit power control commands to the network node, the DPCCH2 having an associated second fractional dedicated physical channel for conveying DPCCH2 uplink transmit power control commands to the user equipment for power controlling the DPCCH2, the second fractional dedicated physical channel having a second allocated slot format different from the first allocated slot format; and
one or more interfaces configured to:
provide the dedicated physical control channel to the user equipment;
provide the DPCCH2 to the user equipment; and
communicate to the user equipment at least one of the DPCCH2 uplink transmit power control commands on the second fractional dedicated physical channel having the second allocated slot format;
wherein the one or more processors are further configured to set an initial power level for the DPCCH2, the initial power level for the DPCCH2 based at least in part on a comparison of a number of transmit power control uplink requests and a number of transmit power control downlink requests from a serving cell.

7. The network node of claim 6, wherein:
the first fractional dedicated physical channel has an associated first spreading code; and
the second fractional dedicated physical channel has an associated second spreading code.

8. The network node of claim 6, wherein the initial power level for the DPCCH2 is equal to a first power level of the DPCCH plus an extra margin.

9. The network node of claim 6, wherein operation of the DPCCH2 is controlled by a discontinuous transmission pattern of the dedicated physical control channel, and the DPCCH2 is only transmitted when the dedicated physical control channel is transmitted.

10. The network node of claim 6, wherein the DPCCH2 is configured only on a primary uplink carrier.

11. A method for controlling uplink transmit power in a user equipment, comprising:
receiving provisioning by a network node of a dedicated physical control channel (DPCCH), the dedicated physical control channel having an associated first fractional dedicated physical channel for conveying DPCCH transmit power control commands to the user equipment for power controlling the dedicated physical control channel, the first fractional dedicated physical channel having a first allocated slot format;
receiving provisioning by the network node of a dedicated physical control channel2 (DPCCH2), the DPCCH2 comprising an uplink control channel power controlled by the network node for communicating DPCCH2 downlink transmit power control commands to the network node, the DPCCH2 having an associated second fractional dedicated physical channel for conveying DPCCH2 uplink transmit power control commands to the user equipment for power controlling the DPCCH2, the second fractional dedicated physical channel having a second allocated slot format different from the first allocated slot format; and
receiving, from the network node, at least one of the DPCCH2 uplink transmit power control commands on the second fractional dedicated physical channel having the second allocated slot format;
wherein an initial power level for the DPCCH2 is based at least in part on a comparison of a number of transmit power control uplink requests and a number of transmit power control downlink requests from a serving cell.

12. The method of claim 11, wherein:
the first fractional dedicated physical channel has an associated first spreading code; and
the second fractional dedicated physical channel has an associated second spreading code.

13. The method of claim 11, wherein the initial power level for the DPCCH2 is equal to a first power level of the DPCCH plus an extra margin.

14. The method of claim 13, wherein the initial power level for the DPCCH2 is set upon initiating transmission of the DPCCH2.

15. The method of claim 11, wherein operation of the DPCCH2 is controlled by a discontinuous transmission pattern of the dedicated physical control channel, and the DPCCH2 is only transmitted when the dedicated physical control channel is transmitted.

16. The method of claim 11, wherein the DPCCH2 is configured only on a primary uplink carrier.

17. A user equipment comprising:
one or more interfaces configured to:
receive provisioning by a network node of a dedicated physical control channel (DPCCH), the dedicated physical control channel having an associated first fractional dedicated physical channel for conveying DPCCH transmit power control commands to the user equipment for power controlling the dedicated physical control channel, the first fractional dedicated physical channel having a first allocated slot format;
receive provisioning by the network node of a dedicated physical control channel2 (DPCCH2), the DPCCH2 comprising an uplink control channel power controlled by the network node for communicating DPCCH2 downlink transmit power control commands to the network node, the DPCCH2 having an associated second fractional dedicated physical channel for conveying DPCCH2 uplink transmit power control commands to the user equipment for power controlling the DPCCH2, the second fractional dedicated physical channel having a second allocated slot format different from the first allocated slot format; and receive, from the network node, at least one of the DPCCH2 uplink transmit power control commands on the second fractional dedicated physical channel having the second allocated slot format; and one or more processors configured to control transmit power based on the received DPCCH2 uplink transmit power control command(s);

wherein an initial power level for the DPCCH2 is based at least in part on a comparison of a number of transmit power control uplink requests and a number of transmit power control downlink requests from a serving cell.

18. The user equipment of claim 17, wherein:

the first fractional dedicated physical channel has an associated first spreading code; and the second fractional dedicated physical channel has an associated second spreading code.

19. The user equipment of claim 17, wherein the initial power level for the DPCCH2 is equal to a first power level of the DPCCH plus an extra margin.

20. The user equipment of claim 17, wherein the initial power level for the DPCCH2 is set upon initiating transmission of the DPCCH2.

21. The user equipment of claim 17, wherein operation of the DPCCH2 is controlled by a discontinuous transmission pattern of the dedicated physical control channel, and the DPCCH2 is only transmitted when the dedicated physical control channel is transmitted.

22. The user equipment of claim 17, wherein the DPCCH2 is configured only on a primary uplink carrier.

\* \* \* \* \*